Feb. 15, 1966 L. M. RICH 3,235,671

MAGNETIC HEAD SUPPORT

Filed Feb. 1, 1962

INVENTOR.
LOUIS M. RICH
BY
Christie, Parker & Hale
ATTORNEYS.

United States Patent Office 3,235,671

Patented Feb. 15, 1966

3,235,671

MAGNETIC HEAD SUPPORT

Louis M. Rich, 2226 Wellington Road, Los Angeles, Calif.

Filed Feb. 1, 1962, Ser. No. 170,409
5 Claims. (Cl. 179—100.2)

This invention relates to spring-loaded supports for operation under high acceleration conditions, and more particularly, is concerned with a spring-loaded support for *magnetic heads.*

The use of drums or disks having a magnetic surface for storing information in magnetic form are well known. A magnetic transducer head having a gap across which the magnetic field is produced is mounted in close proximity to the surface of the drum or disk to record or play back signals stored magnetically on the magnetic surface. Generally the head is not permitted to contact the recording surface in order to prevent wear of the magnetic surface. Extreme care must be taken in the manufacture of the rotating drum or disk, as the case may be, so that the spacing between the magnetic head and the surface does not vary as the drum or disk rotates, to prevent changes in the strength of the signals recorded or played back. Any eccentricity of the rotating member, where the head is rigidly supported, results in such undesirable signal variations. For this reason, the transducer head is frequently mounted so that it can follow the surface variations and maintain contsant spacing between the gap of the head and the magnetic surface of the drum or disk. This means that the mounting for the transducer head must be yieldable so that the head can be moved relative to its support. Various means have heretofore been provided for maintaining constant spacing between the head and the surface of the drum or disk, either by having a portion of the head ride against the surface of the drum, ride against the magnetic surface, or by providing an air cushion or layer between the head and the moving magnetic surface which is arranged to maintain substantially constant thickness.

In any event, the head must be permitted to move slightly to follow variations in the position of the surface as it passes under the head. To provide such a yieldable support presents a problem where the magnetic recording device is to be used in an environment where it is subject to vibration or large acceleration forces.

The present invention is directed to a yieldable spring-loaded support for a magnetic head or other device which must be easily movable wherein the yieldable supporting means does not react to external acceleration forces. In brief, the supporting arrangement of the present invention includes a movable piston on which the magnetic head or other movable element is mounted. The piston slides within a movable sleeve, which in turn slides in a cylindrical bore in the mounting frame. The bore is closed at one end and fluid is provided in the closed end of the bore, the fluid being confined by the end of the piston and surrounding sleeve. Spirng means, such as a coil compression spring, operates between a flange on the piston and the end of the sleeve so as to normally urge the piston and sleeve in opposite directions. The weight of the piston and sleeve are in the same ratio as the cross-sectional areas of the piston and sleeve so that acceleration forces acting in the same direction on the piston and on the sleeve provide equal and balancing pressures on the fluid confined in the closed end of the cylindrical bore. Thus, net movement of the head is produced by acceleration forces acting on both the piston and the sleeve.

For a more complete understanding of the invention, reference should be made to the accompanying drawing.

Figure 1:
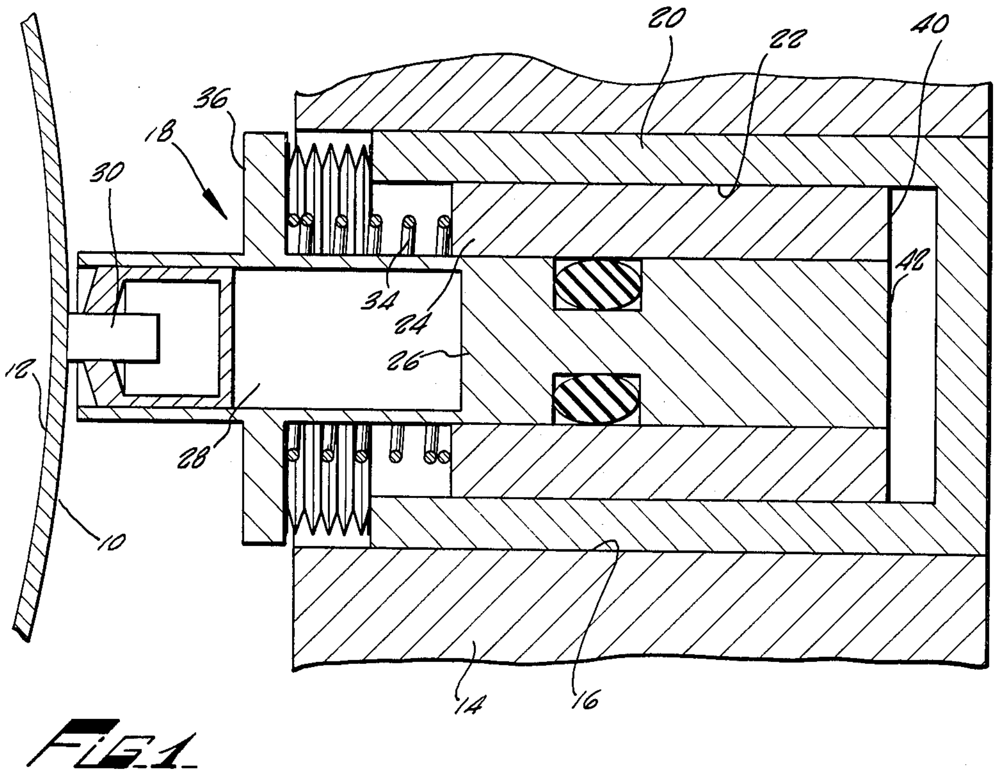
FIGURE 1 is a sectional view of one embodiment of the invention.

Referring to FIGURE 1 in detail, the numeral 10 indicates generally the magnetic surface of a drum or disk, a portion of which is indicated at 12. The drum or disk 12 is rotatably supported in rigid relationship to a transducer head supporting frame indicated generally at 14. The rotating drum or disk and related head supporting frame are generally conventional and well known in the art.

The head mounting frame 14 is provided with at least one opening 16, preferably of circular cross-section, for receiving a transducer head mounting assembly indicated generally at 18. The head mounting assembly includes a cylindrical mounting member 20. The mounting member 20 is inserted in the opening 16 in the frame 14 and secured in position by any suitable means (not shown). The mounting member 20 is provided with a bore 22 of circular cross-section with the bore being closed adjacent one end of the mounting member 20.

The bore 22 is arranged to receive a cylindrical sleeve 24 which is in close contact with the bore but freely slidable therein. Cylindrical sleeve 24 is arranged to receive a piston 26. The piston 26 projects beyond the sleeve toward the drum 12 and is counterbored as indicated at 28 to receive a magnetic transducer head unit 30. The head unit 30 is supported in the bore 28 by a suitable mounting bracket 32 preferably made of non-magnetic material. The face of the transducer 30 is in contact with the recording surface 10 of the drum or disk 12.

The piston 26 is urged toward the magnetic surface of the drum 12 by suitable spring means, such as a compression coil spring 34 extending around the piston adjacent the end of the sleeve 24. One end of the spring 34 engages the end of the sleeve 24, and the other end of the spring engages a flange 36 integral with the piston 26. The spring 34 is pre-loaded to urge the piston in a direction toward the magnetic surface 10 of the drum 12 and to urge the sleeve 24 in the opposite direction toward the bottom of the bore 22 in the mounting member 20.

The inner end of the sleeve 24, indicated at 40, is normally spaced from the bottom of the bore 22, as is the inner end of the piston, indicated at 42. The region at the bottom of the bore is filled with a fluid such as a hydraulic liquid in the preferred arrangement of FIGURE 1. Because of the presence of the liquid in the region at the bottom of the bore 22, any displacement of the magnetic head away from the magnetic surface of the drum due to variations in the surface location of the drum 12 relative to the head 30 as the drum rotates results in a pressure being applied to the liquid by the piston 26. This pressure is transmitted by the fluid to the sleeve 24 which in turn reacts against the compression spring 34. Thus the spring 34 urges the head 30 against the magnetic surface of the drum 12, and at the same time permits movement of the head 30 laterally with any runout of the surface of the drum 12.

At the same time, any acceleration force applied to the drum recording system which has a component parallel to the axis of movement of the recording head 30 operates on both the sleeve 24 and the piston 26 in the same direction. By making the ratio of the weight of the piston and associated head to the sleeve equal to the ratio of the area of the end 42 of the piston to the area of the end 40 of the sleeve, the fluid provides equal counteracting forces on both the piston and the sleeve so that the acceleration force can produce no net movement between the sleeve and the piston even though both are freely movable in relation to the supporting frame 14.

Figure 2:
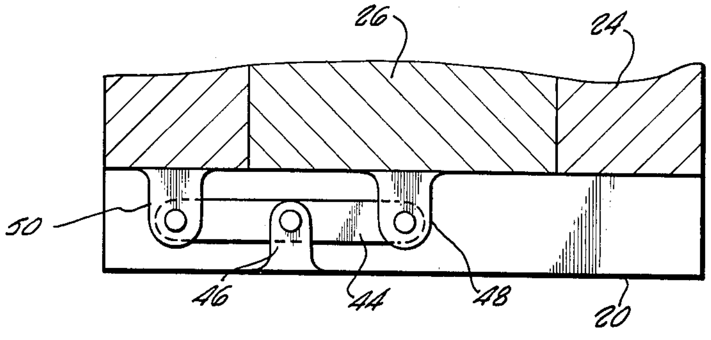
FIGURE 2 is a fragmentary sectional view of a modified form of the invention.

In the arrangement of FIGURE 1, acceleration forces are balanced between the two relatively movable elements of the piston 26 and the sleeve 24. The fluid provides a convenient means of coupling the two elements together to transmit the force between the two. However, the invention may be incorporated in a purely mechanical arrangement such as shown by the modification in FIGURE 2. In this arrangement, the force is transmitted through a simple lever bar such as indicated at 44. The central part of the lever bar 44 is pivotally supported from the mounting member 20 through a lug 46. One end of the bar is pivotally secured to the piston 26 by an integral lug 48 and to the end of the sleeve 24 by an integral lug 50. Thus acceleration forces acting in the same direction on the piston 26 and sleeve 24 are counteracted by the lever 44, whereas a force applied to the piston alone results in opposite movement of the piston and the sleeve through the linkage provided by the lever 44. The position of the fulcrum provided by the lug 46 is such that the acceleration forces on the two masses provided by the piston and sleeve are exactly balanced. Thus, if the weights are unequal the position of the fulcrum along the lever 44 is positioned accordingly such that the ratio of the lever arms on either side of the fulcrum is in the same ratio as the weights of the two elements provided by the sleeve 24 and piston 26.

From the above description, it will be recognized that an arrrangement is provided in which acceleration forces are balanced out and at the same time free movement of the recording head is permitted. If, due to size limitations, the weight of the sleeve and piston cannot be balanced by the proper ratio of areas in the arrangement of FIGURE 1 or the proper ratio of the lengths of the lever arms in the arrangement of FIGURE 2, the weight of the piston and sleeve can be controlled without changing their size by utilizing materials of different specific gravities.

What is claimed is:

1. A magnetic recorder comprising a rotating member having a magnetic recording surface, frame means for rotatably supporting the member, at least one magnetic head, and means supporting the head for movement of the head toward and into contact with the magnetic recording surface, said supporting means including a piston, a movable sleeve surrounding the piston, said frame means having a cylindrical bore closed at one end for receiving the piston and sleeve, the head being secured to the piston, spring means extending between the piston and the sleeve for urging the piston and head toward the member and for urging the sleeve toward the closed end of the bore, and liquid filling the space between the closed end of the bore and the ends of the piston and sleeve, whereby movement of the sleeve in either direction produces movement of the piston in the opposite direction within the bore.

2. Apparatus as defined in claim 1 wherein the ratio of the cross-sectional area of the sleeve to the cross-sectional area of the piston is equal to the ratio of weight of the sleeve to the weight of the piston and head combined.

3. A magnetic recorder comprising a rotating member having a magnetic recording surface, frame means for rotatably supporting the member, at least one magnetic head, and means supporting the head for movement of the head in a direction perpendicular to the magnetic recording surface, said supporting means including a piston, a movable sleeve surrounding the piston, said frame means having a cylindrical bore closed at one end for receiving the piston and sleeve, the head being secured to the piston, spring means extending between the piston and the sleeve for urging the piston and head toward the member and for urging the sleeve toward the closed end of the bore, and lever means interconnecting the piston and sleeve such that movement of the sleeve in either direction produces movement of the piston in the opposite direction within the bore.

4. A magnetic recorder comprising a rotating member having a magnetic recording surface, frame means for rotatably supporting the member, at least one magnetic head, and means supporting the head for movement of the head toward and into contact with the magnetic recording surface, said supporting means including a piston, a movable sleeve surrounding the piston, said frame means having a cylindrical bore closed at one end for receiving the piston and sleeve, the head being secured to the piston, spring means extending between the piston and the sleeve for urging the piston and head toward the member and for urging the sleeve toward the closed end of the bore, and means interconnecting the piston and sleeve such that movement of the sleeve in either direction produces movement of the piston in the opposite direction within the bore.

5. Apparatus comprising a first element, means for constraining movement along an axis, a second element means for constraining movement of the second element movable in a direction parallel to the same axis, the second element being concentric to the first element so that the two elements move along a common path, means for coupling the two elements such that movement of one element in one direction along the axis produces movement of the other element in the opposite direction along the axis, said coupling means providing a predetermined ratio of movement of the two elements, and spring means connected between the two elements for normally urging the elements in opposite directions relative to each other along the axis, the ratio of the weights of the two elements being equal to the inverse of said predetermined ratio of movements of the two elements.

References Cited by the Examiner

UNITED STATES PATENTS 2,776,144 1/1957 Nichols ------------- 274—23

IRVING L. SRAGOW, *Primary Examiner.*

BERNARD KONICK, *Examiner.*